(12) United States Patent
Pan et al.

(10) Patent No.: US 7,892,435 B2
(45) Date of Patent: Feb. 22, 2011

(54) SYSTEM AND METHOD FOR RECYCLING USING NANOCERAMICS

(75) Inventors: Tao Pan, Shanghai (CN); Weijun-William Wang, Shanghai (CN); Linan Zhao, Shanghai (CN); Hongda Li, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 450 days.

(21) Appl. No.: 12/124,338

(22) Filed: May 21, 2008

(65) Prior Publication Data
US 2009/0289012 A1    Nov. 26, 2009

(51) Int. Cl.
*B01J 39/00*    (2006.01)
(52) U.S. Cl. .................. 210/667; 210/691; 210/759; 210/175; 210/194; 210/502.1
(58) Field of Classification Search ........... 210/667, 210/691, 759, 175, 194, 502.1
See application file for complete search history.

(56) References Cited

U.S. PATENT DOCUMENTS

| | | | | |
|---|---|---|---|---|
| 2,886,522 A | * | 5/1959 | Cooper et al. | 208/310 R |
| 4,230,536 A | * | 10/1980 | Sech | 203/89 |
| 6,251,280 B1 | * | 6/2001 | Dai et al. | 210/656 |
| 2006/0049167 A1 | * | 3/2006 | Yang et al. | 219/388 |

OTHER PUBLICATIONS

D. Margolese et al., "Direct Syntheses of Ordered SBA-15 Mesoporous Silica Containing Sulfonic Acid Groups", Chem. Mater. 2000, 12, pp. 2448-2459.
Greger Ledung et al., "A Novel Method for Preparation of Disulfides on Silicon", Langmuir 2001, 17, pp. 6056-6058.

* cited by examiner

*Primary Examiner*—Chester T Barry
(74) *Attorney, Agent, or Firm*—Munck Carter, LLP (57) ABSTRACT

Systems and methods are disclosed that promote the remediation of contaminated materials that are produced during industrial processes. These systems and methods include heating a material, transferring heat from the material to an industrial process. During this transfer, contaminants may be introduced into the material. These methods may remove the contaminant by treating the material with a surface modified nanoceramic through nanofiltration and/or active sites adsorption/reaction. The surface modified nanoceramic may remove at least part of the contaminant in the material. No cooling required prior to removing the contaminant from the material, which can lead to great energy saving and pollution reduction.

26 Claims, 7 Drawing Sheets

SYSTEM AND METHOD FOR RECYCLING USING NANOCERAMICS

TECHNICAL FIELD

This disclosure relates generally to recycling systems and more specifically to a system and method for recycling using nanoceramics.

BACKGROUND

Large quantities of liquids or other materials are often used to transfer heat in industrial processes. During these industrial processes, the liquids or other materials may become contaminated before, during, or after the transfer of heat. One of the problems in industrial processes is how to deal with these contaminated liquids or other materials.

SUMMARY

This disclosure provides a system and method for recycling using nanoceramics.

In one embodiment, a method is disclosed that comprises heating a material, transferring heat from the material to an industrial process. During this transfer, a contaminant may be introduced into the material. These methods may remove the contaminant by treating the material with a nanoceramic. The nanoceramic may remove at least part of the contaminant in the material. In addition, this method may not require cooling prior to the removal of the contaminant from the material, thus saving huge energy consumption.

In another embodiment, a system is disclosed that comprises a tank of material and a heating apparatus configured to heat the material received from the tank. This system also comprises a heat exchanger that is configured to receive the heated material from the heating apparatus and to transfer heat from the heated material. In addition, this system comprises a recycling unit comprising a surface modified nanoceramic that is configured to interact with the heated material received from the heat exchanger and to remove an impurity from the heated material.

In yet another embodiment, an apparatus is disclosed that comprises a tube, where the tube is configured to receive a material containing at least one impurity. In addition, the apparatus comprises a first layer that comprises nanoceramics and is configured to promote a chemical reaction to remove the at least one impurity from the material at a high temperature. The apparatus also comprises a second layer that provides support for the first layer and is configured to promote the chemical reaction.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
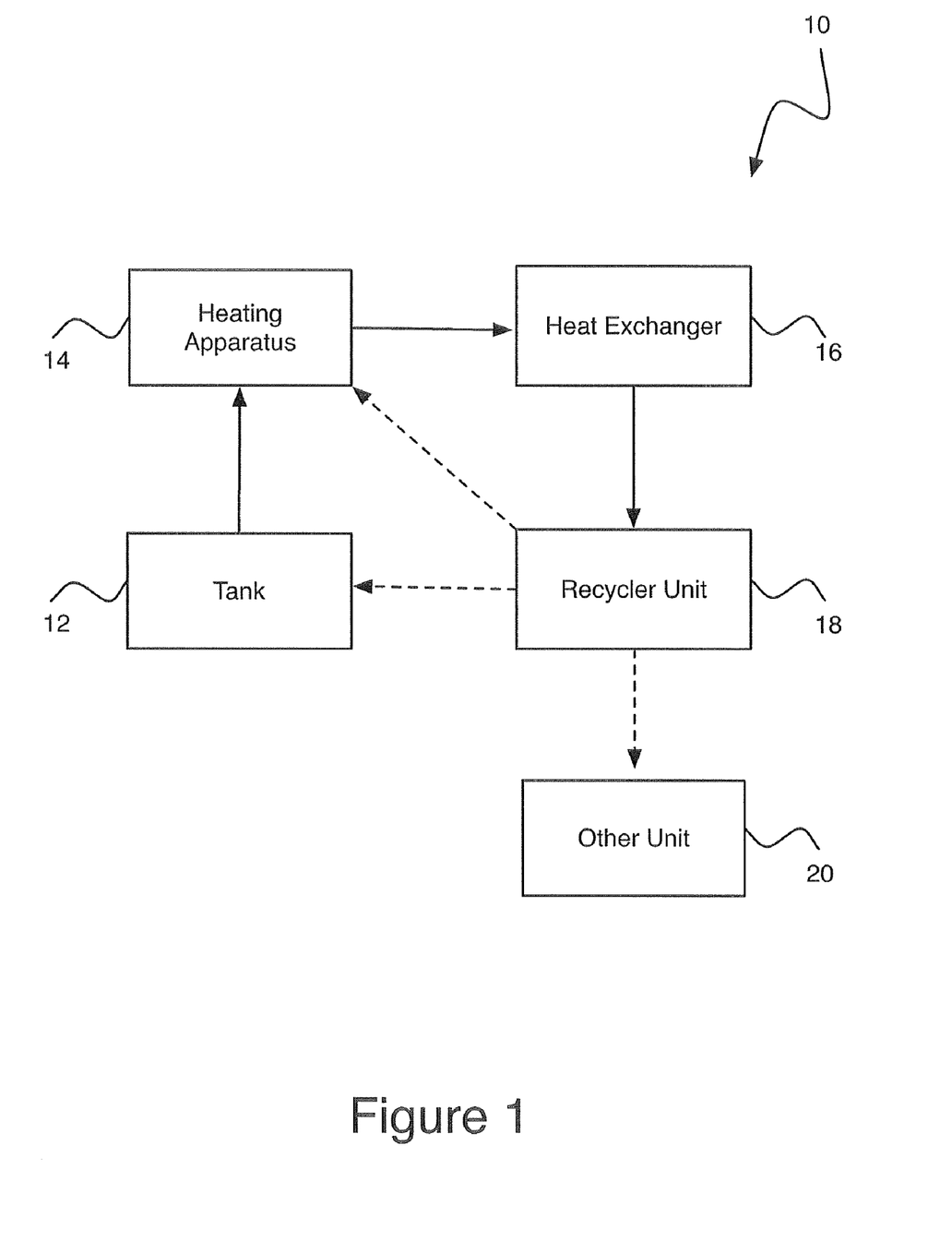
FIG. 1 illustrates an example system with a recycler unit according to one embodiment of this disclosure.

FIG. 1 illustrates an example system 10 with a recycler unit according to one embodiment of this disclosure. In this example, the system 10 recycles contaminated heated liquids or other materials using nanoceramics. The embodiment of the system 10 shown in FIG. 1 is for illustration only. Other embodiments of the system 10 could be used without departing from the scope of this disclosure.

As shown in FIG. 1, the system 10 includes a tank 12, a heating apparatus 14, a heat exchanger 16, a recycler unit 18, and at least one other unit 20 (such as a waste unit). In this example embodiment, a liquid or other material, such as water, is drawn from the tank 12 into the heating apparatus 14. The heating apparatus 14 heats the liquid or other material from the tank 12 and transfers the heated material (such as heated water or steam) into the heat exchanger 16. The heat exchanger 16 uses the heated material in an industrial process. Examples of this industrial process include, but are not limited to, transferring the energy from the heated material to another material or to an apparatus or system. During the transfer of energy in the heat exchanger 16, some or all of the heated material may be in a gaseous state.

One problem associated with this industrial process is that, when the heated material is used to transfer heat, the material may become contaminated, resulting in the creation of contaminated heated material. The heat exchanger 16, when the material has been used, transfers the contaminated heated material into the recycler unit 18. The recycler unit 18 helps to remove the contaminants from the contaminated heated material, creating treated heated material. The removal of contaminants such as iron, oil, silicon or other contaminates may be performed in a single step or through multiple steps. The recycler unit 18 transfers the treated heated material to the tank 12, the heating apparatus 14, or another unit 20. This process allows for the reuse of the contaminated heated material, without losing all of the energy introduced by the heating apparatus 14, or causing any pollution issue.

One method of removing contaminants from the contaminated heated materials involves the interaction of surface modified nanoceramics with the contaminated heated material. The surface modified nanoceramics allow for the recycling of contaminated heated material through nanofiltration and surface active sites (such as a negatively-charged surface group used to adsorb or react with Fe, Ca, Mg, and other metal ions), while still working under high temperature and pressure. The use of nanoceramics also removes the requirement that the contaminated heated material be cooled prior to remediation.

The tank 12 represents any apparatus, structure, or enclosed area capable of holding a liquid. Liquids that the tank 12 may hold include, but are not limited to, water, oil, or other liquid. Tank 12 may be connected to a plurality of different devices and may be capable of transferring a liquid from one or more of the devices to another device.

The heating apparatus 14 may represent any device or other structure capable of transferring heat from a source to a liquid, gas, or other material. Examples of the heating apparatus 14 may include, but are not limited to, an oven, a boiler, or other device capable of introducing heat into a liquid or gas using a heat source. Examples of heat sources may include, but are not limited to, flames, steam, radiated heat, or other sources.

The heat exchanger 16 may represent any device, pipeline or other structure capable of transferring heat from a source to a destination. The destination may be used in conjunction with an industrial process. Heat exchangers generally force a liquid or gas to pass over or through parts of this industrial process. During this process, the heated material may become contaminated with lead, iron, oil or other materials that are dangerous to the environment and the system 10. Therefore, prior to reusing the heated material contaminated by the heat exchanger 16, the heated material may be treated.

The contaminated material (such as a liquid or gas) from the heat exchanger 16 is transferred into the recycler unit 18. The recycler unit 18 removes contaminates from the heated contaminated material using nanoceramics. For example, the recycler unit 18 may pass the contaminated material through a series of tubes, where the tubes use nanoceramics to remove impurities from the contaminated material. In some embodiments, the impurities may attach to the walls of the tubes through chemical bonding. This process may be performed at any suitable temperature (including high temperatures) and promotes the safe remediation of contaminated materials.

The recycler unit 18 may send the treated material into the tank 12 for use in a future application, to the heating apparatus 14 to be reheated, or to another unit 20 and leave system 10. It is understood that the material, after it has been treated by the recycler unit 18, may be usable in a wide variety of applications.

Figure 2:
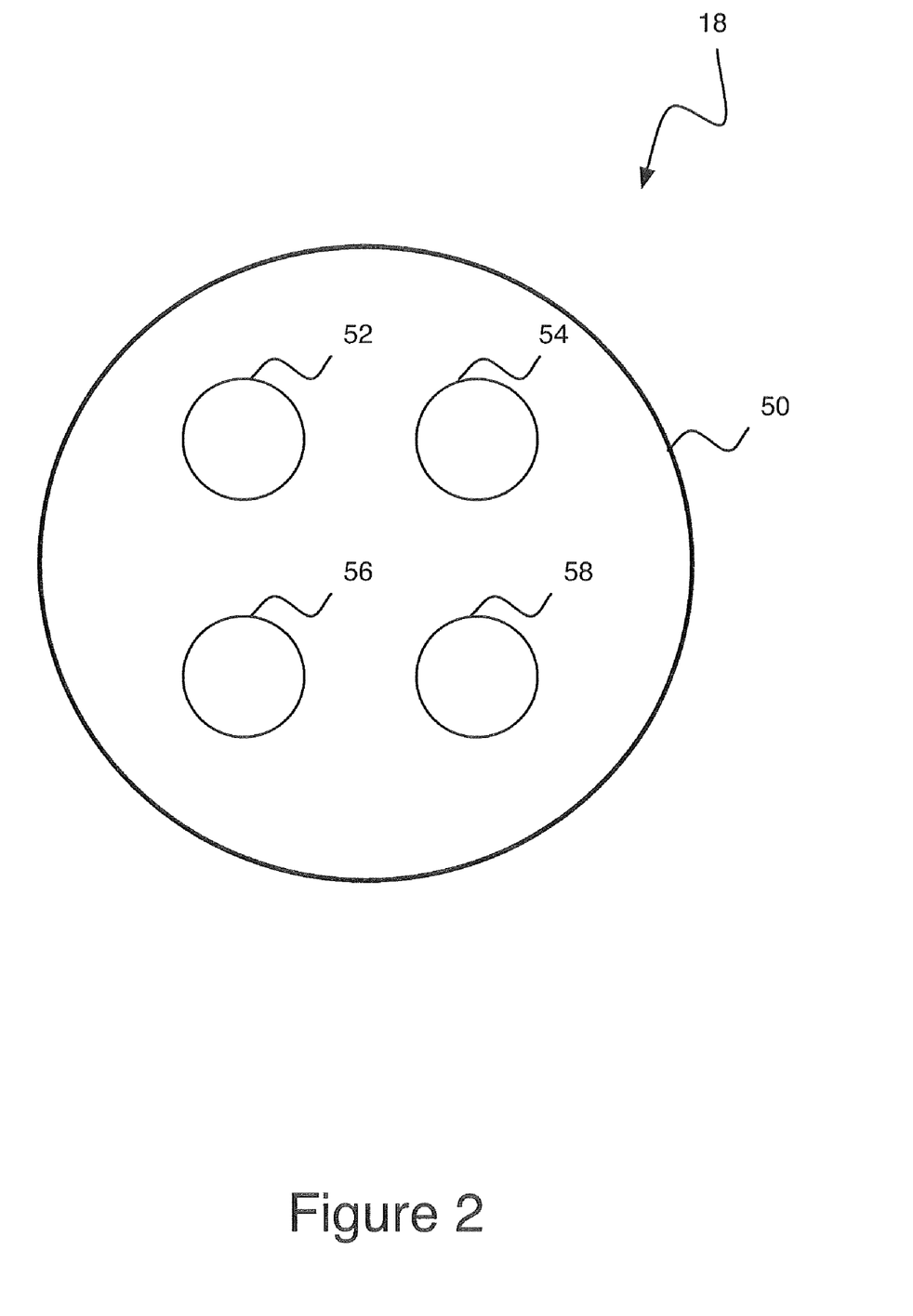
FIG. 2 illustrates an example pipe contained within a recycler unit according to one embodiment of this disclosure.

FIG. 2 illustrates an example pipe 50 contained within a recycler unit 18 according to one embodiment of this disclosure. Within the pipe 50, there is a first tube 52, a second tube 54, a third tube 56, and a fourth tube 58. Each of these tubes may run the entire length of the pipe 50. The first tube 52, the second tube 54, the third tube 56, and the fourth tube 58 may be substantially similar. While four tubes are illustrated in FIG. 2, any number of tubes may be used within the recycler unit 18. It is also understood that pipe 50 may itself be a single large tube.

The pipe 50 generally represents a structure capable of encapsulating various tubes. It is understood that, in applications where heat is retained by the recycler unit 18, the pipe 50 may have insulation placed around the tube 50 to retain heat.

In some embodiments, heated contaminated material is forced to move through one or more of the tubes 52-58. Nanoceramics, or other material substantially similar in reactivity to nanoceramics, line the walls of the tubes 52-58. The contaminated material is forced through the tubes 52-58 and into contact with the nanoceramics. The nanoceramics in the tubes 52-58 remove the contamination from the contaminated material, as discussed below. In this way, the tubes 52-58 can help to remove impurities from the contaminated material being recycled, even at high temperatures and pressures.

Figure 3A:
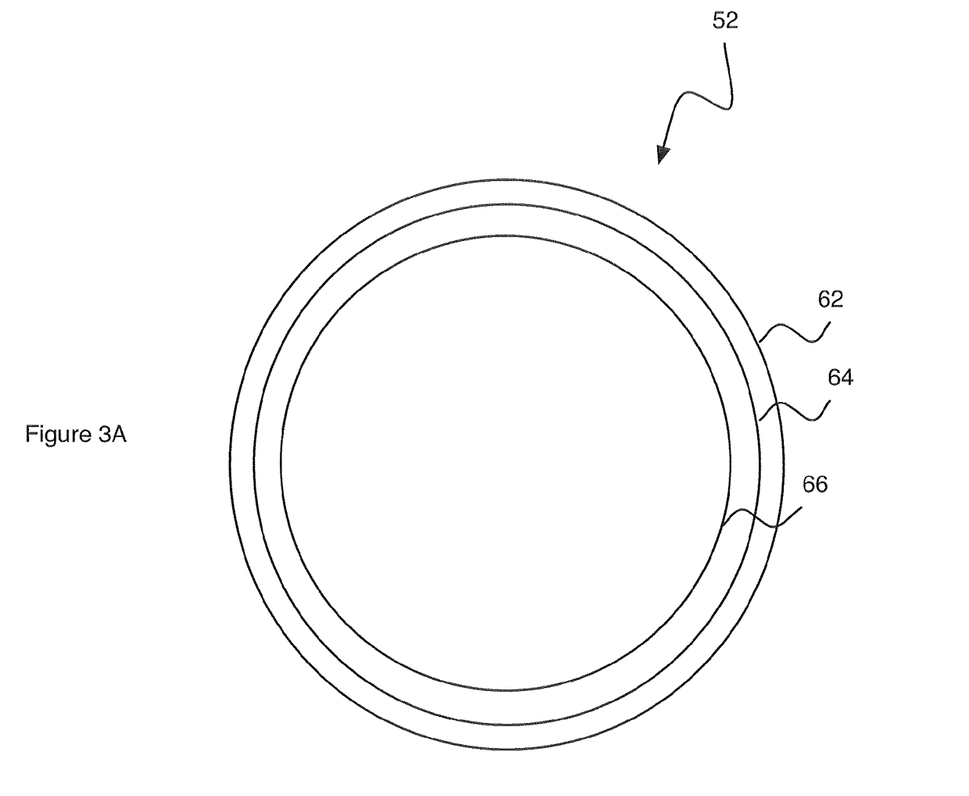
FIG. 3A illustrates an example cross-section of a pipe within a recycler unit according to one embodiment of this disclosure.

FIG. 3A illustrates an example cross-section of a pipe 50 within a recycler unit 18 according to one embodiment of this disclosure. In particular, FIG. 3 illustrates three separate layers along the walls of the first tube 52, namely a first layer 62, a second layer 64, and a third layer 66. When material is passed through the first tube 52, contaminates are absorbed or filtered through the first layer 66, the second layer 64, or the third layer 62. It is understood that each layer (e.g. first layer 66, the second layer 64, or the third layer 62) may be surface modified. It is further understood that while three layers are used in this example, any number of layers of surface modified materials may be used.

The first layer 62, the second layer 64, and the third layer 66 will be discussed in FIG. 3A using the "in-out" mode of operation. It is understood that in other modes of operation that the layers may be reversed. Therefore, in alternative modes of operation, such as those shown in FIG. 3B, the first layer 66 and the third layer 62 may be swapped (e.g. the third layer 62 may be substantially similar to the first layer 66 and the first layer 66 may be substantially similar to the third layer 62).

In some embodiments, the first layer 62 may be formed of at least one supporting material. This supporting material may include, but is not limited to, $Al_2O_3$, $ZrO_2$, $TiO_2$, and $SiO_2$. This supporting material is intended to provide a mechanism for support for an interface layer.

In some embodiments, the second layer 64 may be formed of at least one interface material. An example of the interface material includes, but is not limited to, $Al_2O_3$, ZrO2, SiO2, TiO2. The second layer 64 may allow for the trapping of additional impurities (same surface modification scheme and same ion removal scheme) as well as supporting the nanoceramics. The second layer 64 generally has smaller pores than the first layer 62 and larger pores than the third layer 66. It is understood that the pores of the first layer 62, second layer 64, and third layer 66 may be nanopores.

In some embodiments, the third layer 66 may be a membrane with nanosize pores. FIG. 3A shows this through the use if a broken line. This membrane may be made of $ZrO_2$ or any other material known to one skilled in the art. This membrane may, in some embodiments, block all material that is larger than the pore size, while allowing anything smaller that the pore size to pass through the third layer 66. This configuration reduces blocked material that may accumulate on the membrane. This layer may be modified to perform specific functions, such as adjusting hydrophic qualities of the nanoceramics, adjusting positive and negative surface properties of the nanoceramics, and adjusting the nanoceramics to be selective reactive to chelating groups or ligand groups. It is understood that the second layer 64 and the first layer 62 may be configured to promote a chemical reaction similar to the third layer 66.

In some embodiments, the layers 62, 64, 66 may be formed of surface modified nanoceramics that can serve various functions including, but not limited to, filtration and selective ion removal of impurities from liquids or other materials. Filtration may refer to the physical trapping of impurities in processes including, but not limited to, nanofiltration and microfiltration. Selective ion removal may refer to performing selective ion removal from liquids or other materials. In particular embodiments, these surface nanoceramics promote the effective removal of iron, oil, and other impurities in condensation water.

Figure 3B:
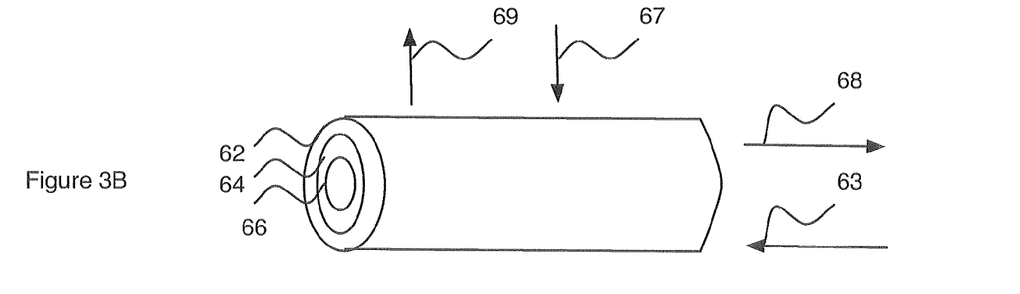
FIG. 3B illustrates an example side view of a pipe within a recycler unit according to one embodiment of this disclosure.

FIG. 3B illustrates a side view of first tube 52. In this side view, arrows 67 and 68 show a first mode of operation, and arrows 69 and 63 show a second mode of operation. In the first mode of operation, known as the "out-in" mode, material is pushed through the first layer 62 as shown by arrow 67. In this first mode of operation, the material is then pushed through the second layer 64 and into the inner chamber created by third layer 66. The material then exits the first tube through the inner chamber created by third layer as shown by arrow 68. In this mode, 62 is nanopore membrane, 64 and 66 are supporting layers. All three layers may be surface modified.

In the second mode of operation, known as the "in-out" method, material enters first tube 52 through the inner chamber created by third layer 66 as shown by arrow 63. The material is pushed through the third layer 66, through the second layer 64, and exits the first tube 52 through the third layer 62 as shown by arrow 69. In this mode, 66 is nanopore membrane, 64 and 62 are supporting layers. All three layers may be surface modified.

It is expressly understood that the chemical structures of the nanoceramics may be formed using any suitable materials. These materials may include metals and silicon oxides, nitrides, sulfides, selenides, or tellurides of metals. These nanoceramics may also be created using any suitable technique, including chemical techniques (such as hydrothermal, solid state reaction), physical techniques (such as grinding, sonication), or combinations thereof (such as sol-gel). As particular examples, nanoceramics may be formed of materials including, but not limited to, the followings compounds or any combinations of the following compounds: $ZnO$, $CdO$, $SiO_2$, $TiO_2$, $ZrO_2$, $CeO_2$, $SnO_2$, $Al_2O_3$, $In_2O_8$, $La_2O_3$, $Fe_2O_8$, $Cu_2O$, $Ta_2O_5$, $Nb_2O_5$, $V_2O_6$, $MoO_3$, $WO_3$, $CdS$, $ZnS$, $PbS$, $Ag_2S$, $GaSe$, $CdSe$, $ZnSe$, $ZnTe$, $CdTe$, $AgCl$, $AgBr$, $AgI$, $CuCl$, $CuBr$, $CdI_2$, $PbI_2$, $CdC_2$, $SiC$, $AlAs$, $GaAs$, $GeAs$, $InSb$, $BN$, $AlN$, $Si_3N_4$, $Ti_3N_4$, $GaP$, $InP$, $Zn_3P_2$, $Cd_3P_2$, phosphates, silicates, zirconates, aluminates, stannates, zeolites, soils.

The hydrophic qualities of the surface modified nanoceramics may be adjusted to change the reactivity of the nanoceramics. For instance, the nanoceramics may be more hydrophic for improved oil/organic removal. Other alterations of the hydrophic qualities may be performed using chemical, plasma/radical, heat, and/or other chemical/physical treatments.

Surface modification may also be used to create reactions with specific positive and negative surface groups. For instance, surface modification for negative charges may be used to immobilize negatively-charged surface groups such as, but not limited to, sulfonic groups (including derivatives), carboxyl groups, acidic groups, hydroxyl groups, surfactants, phenol or hydroxybenzene groups, organics, and polymerics. Surface modification may also be used to create or immobilize positively-charged surface groups such as, but not limited to, amine derivatives (including —NH2, NHR, NR2), metallics, metal ions, surfactants, organics, and polymerics.

In addition to modifying the charge of a surface group, surface modification may be used to create or immobilize any chelating groups or ligand groups that can selectively bind to the metal ions or other functional groups.

Figure 4:
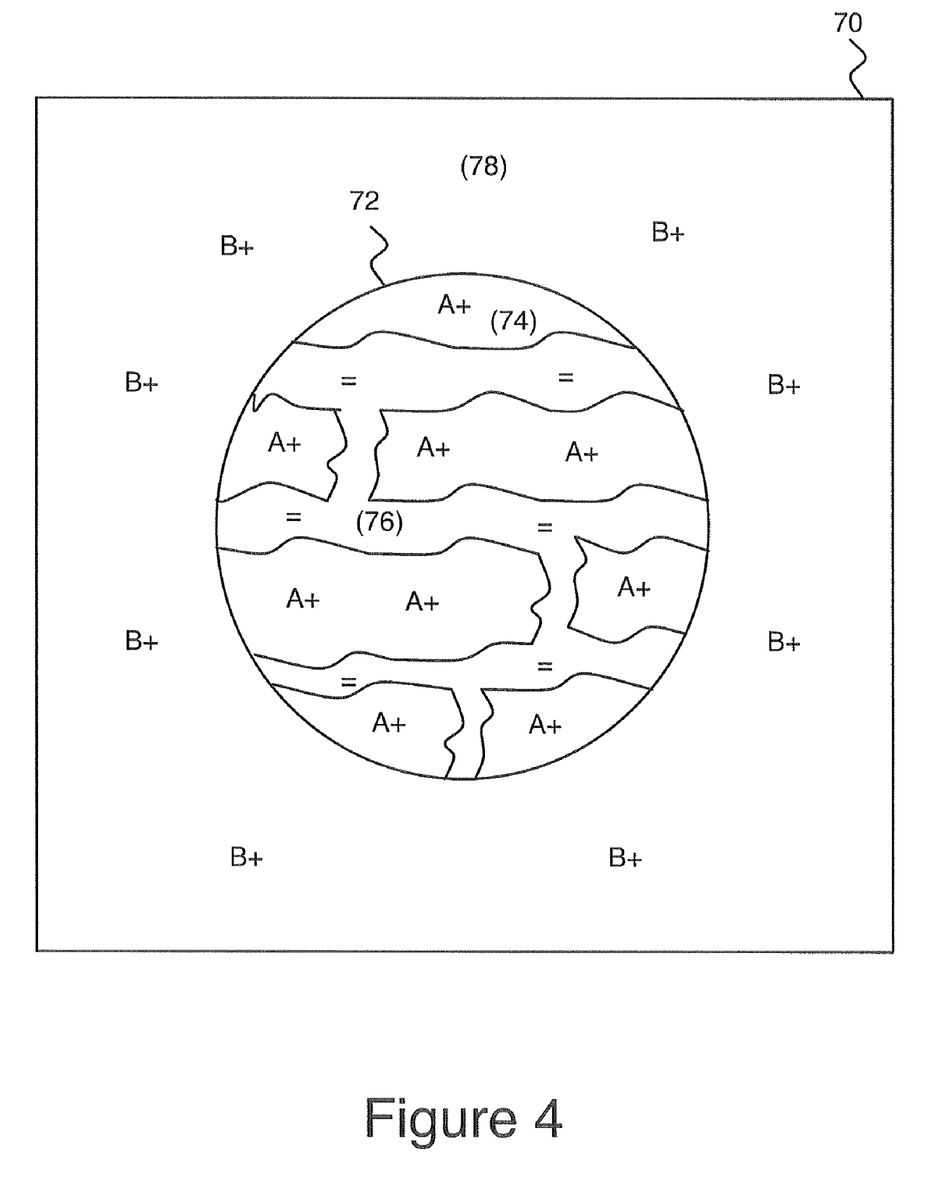
FIG. 4 illustrates an example composition of a pipe wall prior to exposure with contaminated liquid or other material according to one embodiment of this disclosure.

FIG. 4 illustrates an example composition of a pipe wall 70 prior to exposure with contaminated liquid or other material according to one embodiment of this disclosure. The pipe wall 70 includes a surface modified nanoceramic 72 prior to interaction with contaminants. This cross-section of a nanoceramic shows the surface modified ions 74 and the nanofiltration pores 76. Impurities are shown as B+, and the nanoceramic ions are shown as A+. Impurities are shown outside of the surface modified nanoceramic 72.

Figure 5:
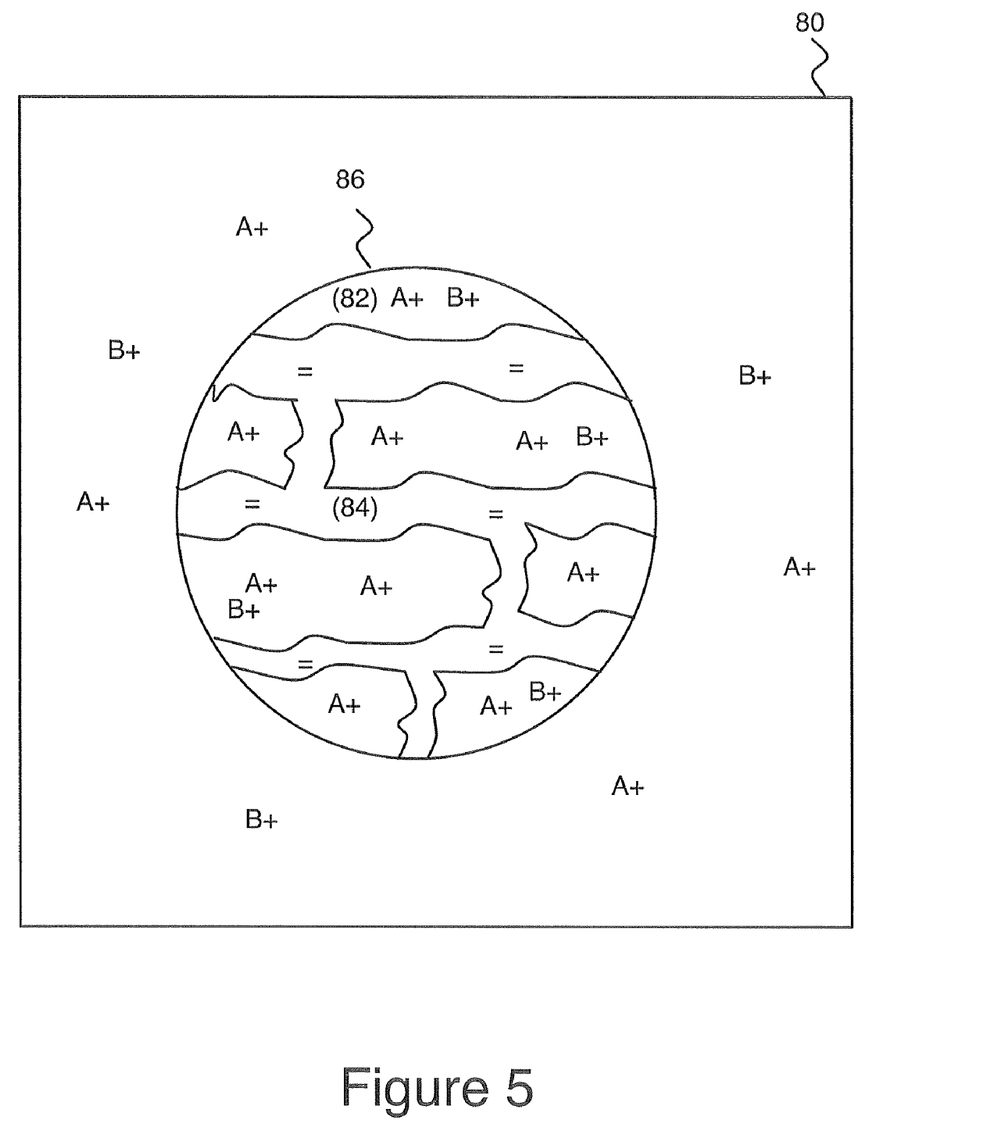
FIG. 5 illustrates an example composition of a pipe wall after exposure with contaminated liquid or other material according to one embodiment of this disclosure.

FIG. 5 illustrates an example composition of a pipe wall 80 after exposure with contaminated liquid or other material according to one embodiment of this disclosure. In this example, contaminates may travel through pore 84 and may be attached to the surface 82 of a surface modified nanoceramic 86. FIG. 5 shows that the contaminants and ions of the surface modified nanoceramic may become bonded together on the surface on the surface modified nanoceramic.

Figure 6:
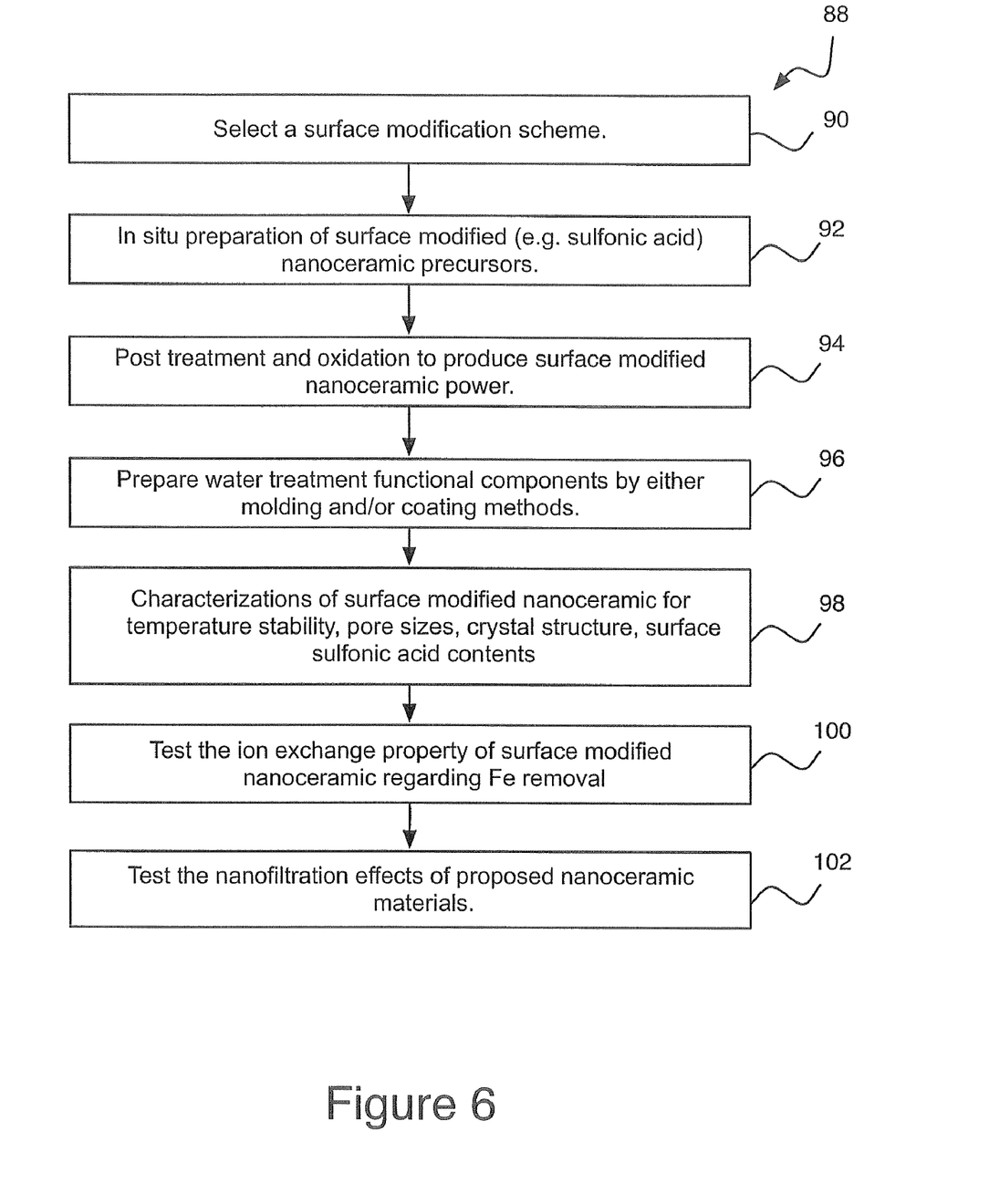
FIG. 6 illustrates an example method of preparing nanoceramics according to one embodiment of this disclosure.

FIG. 6 illustrates an example method 88 of preparing nanoceramics according to one embodiment of this disclosure. In block 90, a surface modification scheme is selected. This surface modification scheme may be directed towards the removal of one or more impurities from a material, as discussed above. For instance, the nanoceramics may have been treated with Mercaptopropyltrimethoxysilane (MPTS) to create a reaction site. Through H2O2 oxidization it may be prepared for sulfonic precursors. Through hydrolysis reaction, the sulfonic precursors are used to attach —SO3H to the wall of the nanoceramic.

In block 92, in situ preparation of surface modified (e.g. sulfonic acid) nanoceramics precursors is performed. In block 94, post treatment and oxidation of the nanoceramic precursors creates a surface modified nanoceramics powder. In block 96, water treatment functional components are prepared, such as by molding and/or coating methods. In block 98, characterizations of the surface modified nanoceramic for temperature stability, pore sizes, crystal structure, and surface sulfonic acid contents are determined. In block 100, the surface modified nanoceramic ion exchange properties are tested, such as for adequate Fe removal. In block 102, the surface modified nanoceramic nanofiltration effects of the proposed nanoceramic materials are tested.

Figure 7:
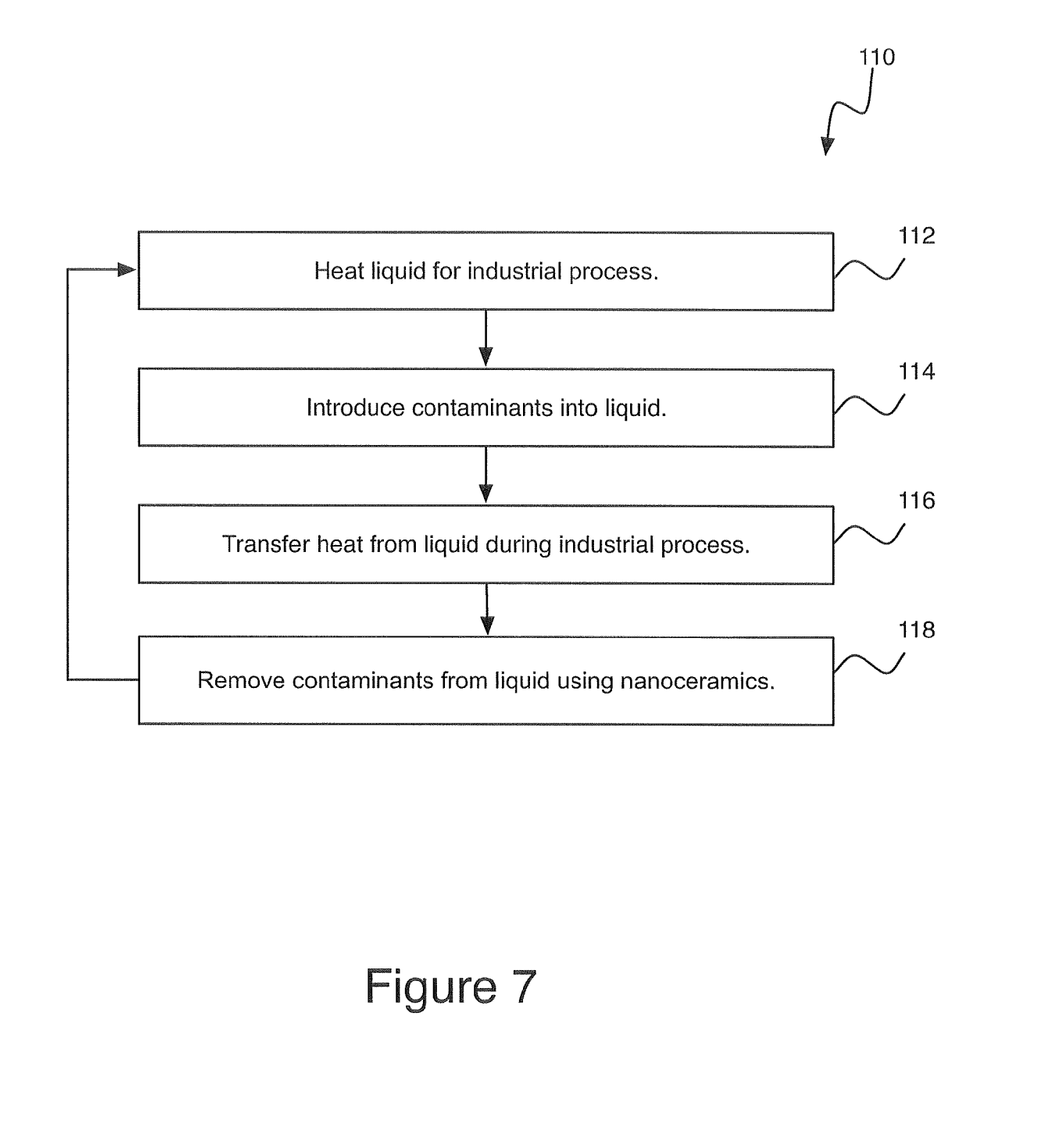
FIG. 7 illustrates an example method of removing contaminants from a liquid or other material according to one embodiment of this disclosure.

FIG. 7 illustrates an example method 110 of removing contaminants from a liquid or other material according to one embodiment of this disclosure. In block 112, liquid is heated for an industrial process. In block 114, contaminants are introduced into the liquid. In block 116, heat is transfer from the liquid to another apparatus or other material(s) during the industrial process. In block 118, the contaminants are removed from the liquid using nanoceramics. The liquid is then reused in the industrial process. Note that while a liquid is shown as being used here, any other material(s) could also be used in the method 110.

It is understood that over time, the effectiveness or reactivity of the nanoceramics may be decreased. It is also understood that the nanoceramics could be regenerated to regain the effectiveness of the nanoceramics. This regeneration could be carried out by flow water, acidic solution (e.g. HCl, $NH_4Cl$ to provide H+), NaCl, basic solution (e.g. NH3.H2O, NaOH, KOH, etc) or a combination thereof. A solution rinse with a pH less than or equal to 8.5 could also be used. It is explicitly understood that any number of different methods of regeneration may be used to restore the effectiveness of the nanoceramics as known to one skilled in the art.

It may be advantageous to set forth definitions of certain words and phrases used throughout this patent document. The terms "include" and "comprise," as well as derivatives thereof, mean inclusion without limitation. The term "or" is inclusive, meaning and/or.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   heating a material;
   transferring heat from the material to an industrial process, wherein a contaminant is introduced into the material; and
   treating the material with a nanoceramic, wherein at least part of the contaminant in the material is removed from the material by the nanoceramic, and wherein at least part of the contaminant is removed from the material without requiring that the material be cooled after the transfer of heat has been performed.

2. The method of claim 1, wherein the material comprises water or steam.

3. The method of claim 1, further comprising:
   reheating the treated material.

4. The method of claim 1, further comprising:
   regenerating the nanoceramics.

5. The method of claim 1, wherein the material is in a gaseous state when the contaminant in the material is treated with the nanoceramic.

6. The method of claim 1, wherein:
   the nanoceramic comprises nanopores and micro pores; and
   the contaminant is filtered through the nanopores and micro pores of the nanoceramic.

7. The method of claim 1, wherein the nanoceramic is comprised of a material selected from $Al_2O_3$, $ZrO_2$, $TiO_2$, and $SiO_2$, or a combination thereof.

8. The method of claim 1, wherein the nanoceramic is treated with mercaptopropyltrimethoxysilane (MPTS).

9. The method of claim 8, wherein the treated nanoceramic undergoes oxidation with $H_2O_2$.

10. The method of claim 9, wherein the oxidized nanoceramic with at least one immobilized sulfonic precursors produces at least one sulfonic group from the material.

11. The method of claim 1, wherein:
    the nanoceramic comprises nanopores; and
    the contaminant is filtered through the nanopores of the nanoceramic.

12. The method of claim 10, wherein the nanoceramic reacts to only the contaminates in heated materials.

13. The method of claim 1, wherein the nanoceramic comprises a plurality of surface modified nanoceramic layers.

14. The method of claim 13, wherein the surface modified nanoceramic reacts to only the contaminant.

15. A system comprising:
    a tank of material;
    a heating apparatus configured to heat the material received from the tank;
    a heat exchanger configured to receive the heated material from the heating apparatus and to transfer heat from the heated material; and
    a recycling unit comprising a surface modified nanoceramic, wherein the surface modified nanoceramic is configured to interact with the heated material received from the heat exchanger and to remove an impurity from the heated material.

16. The system of claim 15, wherein an impurity is introduced into the material through a component selected from a list comprising: a heat exchanger, a pipe, or an industrial process.

17. The system of claim 16, wherein the surface modified nanoceramic comprises nanopores that perform nanofiltration.

18. The system of claim 17, wherein the surface modified nanoceramic comprises three layers.

19. The system of claim 18, wherein the impurity is filtered through the surface modified nanoceramic.

20. The system of claim 18, wherein the impurity is absorbed and removed by the surface modified nanoceramic.

21. An apparatus comprising:
    a tube, wherein the tube is configured to receive a material containing at least one impurity;
    a first layer, wherein the first layer comprises nanoceramics and is configured to promote a chemical reaction to remove the at least one impurity from the material at a high temperature; and
    a second layer, wherein the second layer provides support for the first layer and is configured to promote the chemical reaction.

22. The apparatus of claim 21, wherein the nanoceramics are configured to filter a second impurity from the material.

23. The apparatus of claim 22, wherein the material is substantially comprised of water.

24. The apparatus of claim 23, wherein the material is in both a liquid and a gaseous state.

25. The apparatus of claim 22, wherein the second layer allows filtered material to exit the tube.

26. The apparatus of claim 25, wherein the pores of the second layer are larger than the pores of the first layer.

* * * * *